United States Patent
Patki et al.

(10) Patent No.: US 6,181,713 B1
(45) Date of Patent: Jan. 30, 2001

(54) SELECTABLE DEPACKETIZER ARCHITECTURE

(75) Inventors: Ema Patki, Mtn. View; Daniel C. W. Wong, San Jose, both of CA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 08/958,610

(22) Filed: Oct. 27, 1997

(51) Int. Cl.$^7$ .......................................................... H04J 3/24
(52) U.S. Cl. ............................................ 370/474; 370/476
(58) Field of Search ..................................... 370/389, 394, 370/395, 396, 465, 470, 471, 472, 473, 479, 476, 477

(56) References Cited

U.S. PATENT DOCUMENTS

| | | | | |
|---|---|---|---|---|
| 4,612,636 | * | 9/1986 | Grover et al. ......................... | 370/466 |
| 5,387,941 | * | 2/1995 | Montgomery et al. ............... | 348/473 |
| 5,390,184 | * | 2/1995 | Morris .................................. | 370/353 |
| 5,559,559 | * | 9/1996 | Jungo et al. .......................... | 348/432 |
| 5,691,986 | * | 11/1997 | Pearlstein ............................. | 370/477 |
| 5,832,256 | * | 11/1998 | Kim ...................................... | 395/556 |

* cited by examiner

*Primary Examiner*—Ajit Patel
*Assistant Examiner*—Bob A. Phunkulh

(74) *Attorney, Agent, or Firm*—The Hecker Law Group

(57) ABSTRACT

A scheme is provided that permits the use of a selectable depacketization module to depacketize data streams. An RTP session manager is responsible for receiving RTP packets from a network and parsing/processing them. A depacketizer module is located using the type of data received on the stream. Thus a specific depacketizer is located at runtime depending on the coding decoding scheme ("codec") used to compress the incoming data stream. A naming convention is followed in order for a specific depacketizer to be located. The depacketizer receives data that has already been parsed and is in a readable form. The depacketizer outputs this data using a well defined interface. This interface has been designed such that it is generic across a number of codecs. The interface passes all relevant information to the decoder where the actual depacketized data stream will be decompressed. The session manager need not know of any codec details since the depacketizer handles all codec specific issues. A default format is described for data that is output by a depacketizer. There is provision for a depacketizer to output data in this pre-defined format. However, there is also a provision for a depacketizer to output data itself in a pre-defined format. This data is provided to a handler that is aware of this format, so that the integration of depacketizers is seamless. Thus, a depacketizer can be made available as long as it implements certain defined interfaces.

1 Claim, 4 Drawing Sheets

SELECTABLE DEPACKETIZER ARCHITECTURE

BACKGROUND OF THE INVENTION

1. Field of the Invention

This invention relates to the field of sending and receiving data packets on a computer network.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

2. Background Art

Computers are often used to process, play back, and display video data, audio data and other data. This data may come from sources such as storage devices, on-line services, VCRs, cable systems, broadcast television tuners, etc. Video and audio data is memory intensive, that is, such data requires large amounts of memory for storage and use by a computer system. In addition, the transmission time of such large volume data from a remote source to a client computer can be expensive and be a limiting factor in the ability to provide such data at all.

To reduce the transmission bandwidth and memory requirements when working with data, various compression schemes have been developed so that less storage space is needed to store information and a smaller bandwidth is needed to transmit it. Prior art video compression schemes include Motion JPEG, MPEG-1, MPEG-2, Indeo, Quicktime, True Motion-S, CinePak, and others. Similarly, there are a number of compression schemes for audio data.

The use of compression schemes for transmitting video and audio is particularly important in the context of computer networks, such as the Internet and World Wide Web. Providers wish to provide multi-media content that includes video and audio to users and transmit such content over the Internet. Transmission times become too long if the data is not compressed. In addition, it is not possible to provide real time streaming of video and audio data without a compression scheme.

RTP is a Real Time Transport protocol used to transmit audio and video on a network such as the Internet. Typically, audio or video data is compressed using a specific compression technique and the compressed data stream is broken down into smaller packets for transmission over the wire. This process is referred to as "packetization" and the reverse process, i.e. assembling network packets into a continuous byte stream is called "depacketization". An RTP session handler is a mechanism that controls the receipt and depacketization of packetized data at a client computer. In the prior art, the depacketization scheme is part of the RTP session handler's code. This is a disadvantage because it requires that the RTP session handler have foreknowledge of all possible packetization schemes. This makes it difficult to add new packetization schemes without requiring that a new RTP session handler be created. It would be advantageous if the depacketization could exist as a separate module.

SUMMARY OF THE INVENTION

A scheme is provided that permits the use of a selectable depacketization module to depacketize data streams. An RTP session manager is responsible for receiving RTP packets from a network and parsing/processing them. A depacketizer module is located using the type of data received on the stream. Thus a specific depacketizer is located at runtime depending on the coding decoding scheme ("codec") used to compress the incoming data stream. A naming convention is followed in order for a specific depacketizer to be located. The depacketizer receives data that has already been parsed and is in a readable form. The depacketizer assembles this data into frames and outputs frame data to a handler according to an interface of the preferred embodiment. This interface has been designed such that it is generic across a number of codecs. The interface passes all relevant information to the decoder where the actual depacketized data stream will be decompressed. The session manager need not know of any codec details since the depacketizer handles all codec specific issues.

A default format is described for data that is output by a depacketizer. There is provision for a depacketizer to output data in this pre-defined format. However, there is also a provision for a depacketizer to output data itself in a pre-defined format. This data is provided to a handler that is aware of this format, so that the integration of depacketizers is seamless. Thus, a depacketizer can be made available as long as it implements certain defined interfaces. Special intelligence on packet loss, error recovery, and other data can be utilized by the depacketizer and various proprietary codecs are allowed to be used inside of the RTP session manager, making use of the protocol state management code of the session manager.

DETAILED DESCRIPTION OF THE INVENTION

Figure 1:
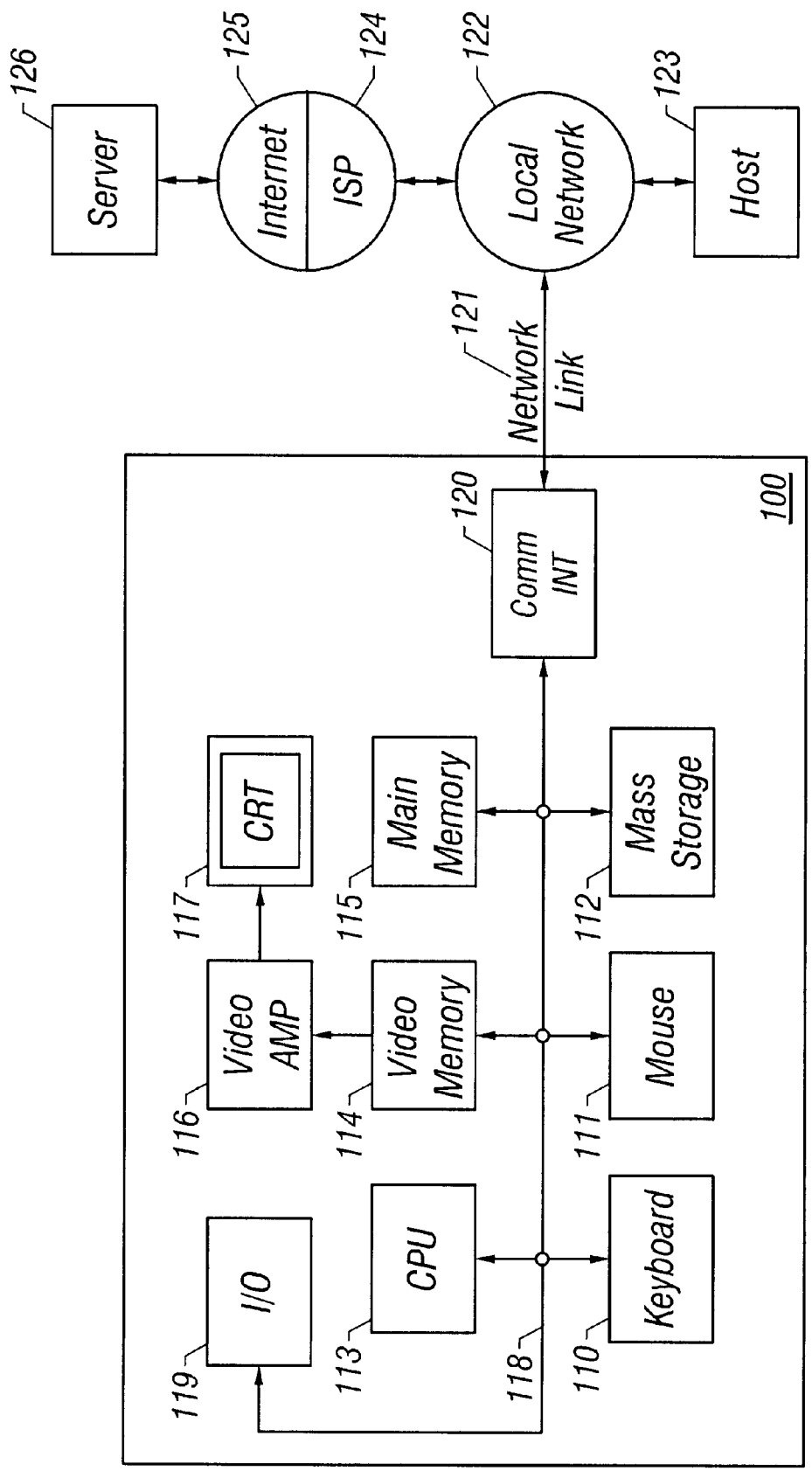
FIG. 1 is a block diagram of an exemplary computer system for implementing the present invention.

The invention is a method and apparatus for providing a selectable depacketizer. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

JAVA

The preferred embodiment of the invention is implemented in the Java® language developed by Sun Microsystems, Inc. of Mountain View, Calif. The following is background on Java and on object oriented programming.

Java is an object-oriented programming language. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation.

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both instance variables and methods for the class. An object class is used to create a particular instance of an object. An instance of an object class includes the variables and methods defined for the class. Multiple instances of a the same class can created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software program can be written using an object-oriented programming language whereby the program's functionality is implemented using objects.

Development of software applications may be performed in an independent piecewise manner by establishing application programming interfaces (APIs) for components of the application. An API refers to the methods of a particular component that are accessible by other components, and the format by which those methods may be invoked. The particular implementation of those methods is important only with respect to the design of the particular component. Each component is designed individually to implement its respective API and any internal functions, and to interface with the APIs of the other components of the application. Typically, these components comprise one or more objects forming the application.

Examples of object-oriented programming languages include C++ and Java. Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

Embodiment of Computer Execution Environment (Hardware)

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola®, such as the 680X0 processor or a microprocessor manufactured by Intel®, such as the 80X86, or Pentium® processor, or a SPARC® microprocessor from Sun Microsystems®. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible.

In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120.

The received code may be executed by CPU 113 as it is received, and/or stored in mass storage 112, or other non-volatile storage for later execution. In this manner, computer 100 may obtain application code in the form of a carrier wave.

The computer systems described above are for purposes of example only. An embodiment of the invention may be implemented in any type of computer system or programming or processing environment.

PREFERRED EMBODIMENT

The present invention provides a system that permits the use of a selectable depacketizer. The preferred embodiment of the present invention contemplates the use of RTP and the use of an RTP session manager to handle the receipt of data (in the preferred embodiment, video or audio data). The RTP session manager is described below.

RTP SESSION MANAGER

The RTP Session Manager (RTPSM) allows a local participant to participate (send or receive data) in a single RTP "session". The RTPSM maintains an updated state of the session as viewed from the local participant. In effect, an instance of an RTPSM is a local representation of a distributed entity (an RTP session). It allows an application to render and create data streams on an RTP session. One embodiment of this invention takes advantage of the Java Media Framework (JMF) described in Appendix A herein.

Figure 2:
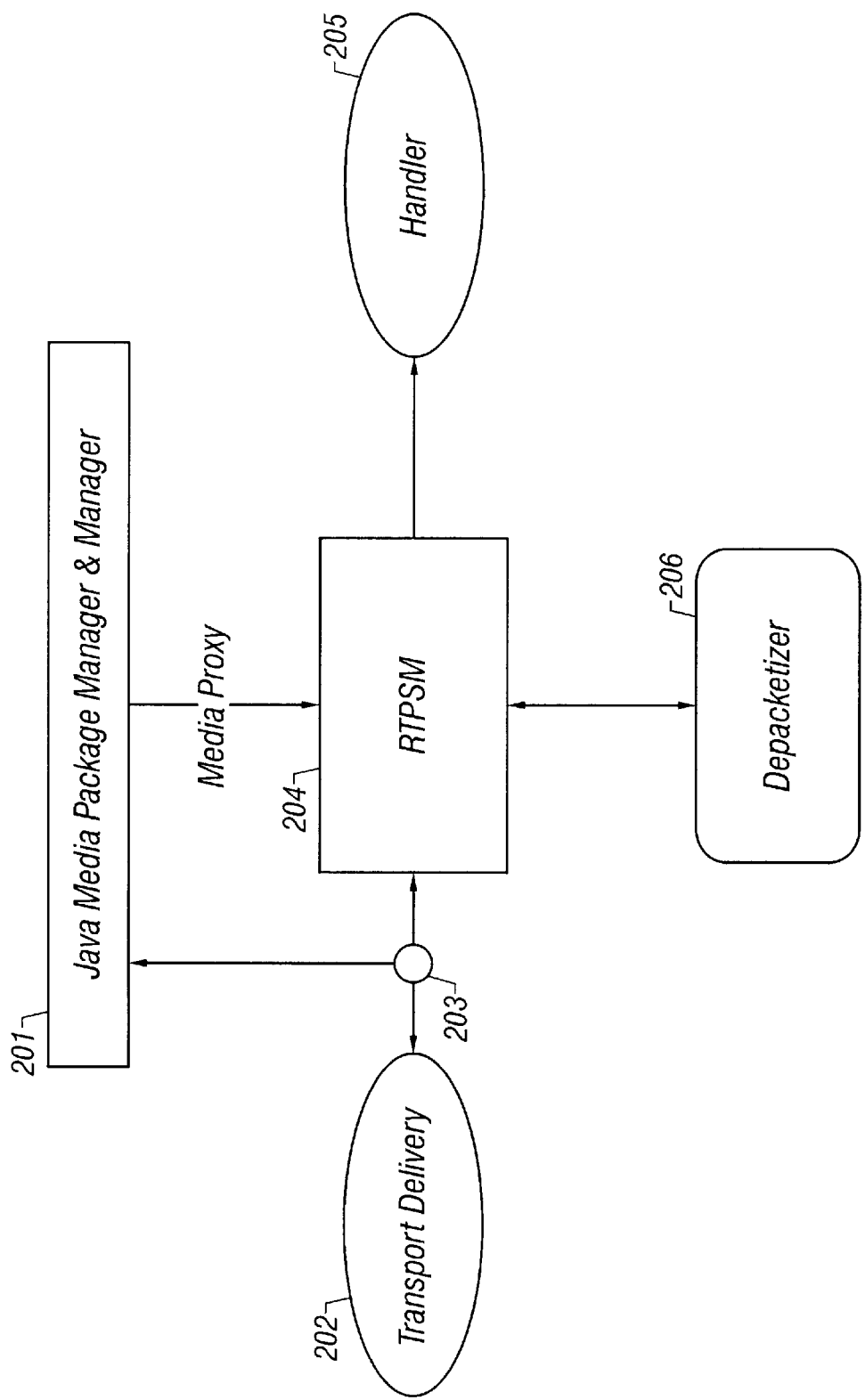
FIG. 2 ilustrates the RTP Session Manager of the present invention.

A graphical representation of the RTP Session Manager is illustrated in FIG. 2. The java media package manager 201 handles the creation of players and locates the appropriate players. Manager 201 is part of the JMF. The Java Media Framework (JMF) is a set of multimedia APIs and implementations designed to playback multimedia in a variety of protocols and formats, such as a QuickTime Cinepak movie over the HTTP (Hypertext Transfer Protocol) protocol. The Java Media Framework specifies the concept of a "player," a unit to playback multimedia data.

Transport delivery 202 receives data streams from the network and provides them, via RTPSocket 203, the to RTP Session Manager 204. The Session Manager 204 inspects the RTP packet and determines what the encoding is. Depending on the type of encoding, the Session Manager 204 identifies and invokes the appropriate depacketizer 206.

The Session Manager 204 sends RTP packets to the depacketizer 206. The depacketizer 206 assembles the packets into frames as appropriate for the codec environment of the packets and sends them via the Session Manager 204 to the handler 205. Handler 205 decodes the frames and provides playback as appropriate.

The RTPSM 204 represents the session with two dynamic sets of objects —a set of "participants" and a set of "streams". The stream is provided by transport delivery 202. These objects are created by and controlled by the RTPSM. A participant is a single machine, host or user participating in the session, while a stream is a series of data packets arriving from or sent by a single source. A participant may own more than one stream, each of which is identified by the SSRC used by the source of the stream.

At the top-most level the RTPSM manages a set of "participants" (RTPParticipant ), each represented by an instance of a class implementing the RTPParticipant interface. RTPSM implementations create RTPParticipant whenever a previously unidentified RTCP (Real Time Control Protocol) packet is received. (The RTPParticipant object is updated each time a subsequent RTCP packet from this source arrives).

In addition to the set of RTPParticipant objects, an RTPSM implementation also manages a set of RTPStream objects. Each such object represents a stream of RTP data packets on the session; if the stream originates from the local participant (the client) it is an instance of the RTPSendStream subclass; otherwise the stream is coming off the net from a remote participant and is an instance of the RTPRecvStream subclass.

PLUGGABLE DEPACKETIZER ARCHITECTURE

Figure 4:
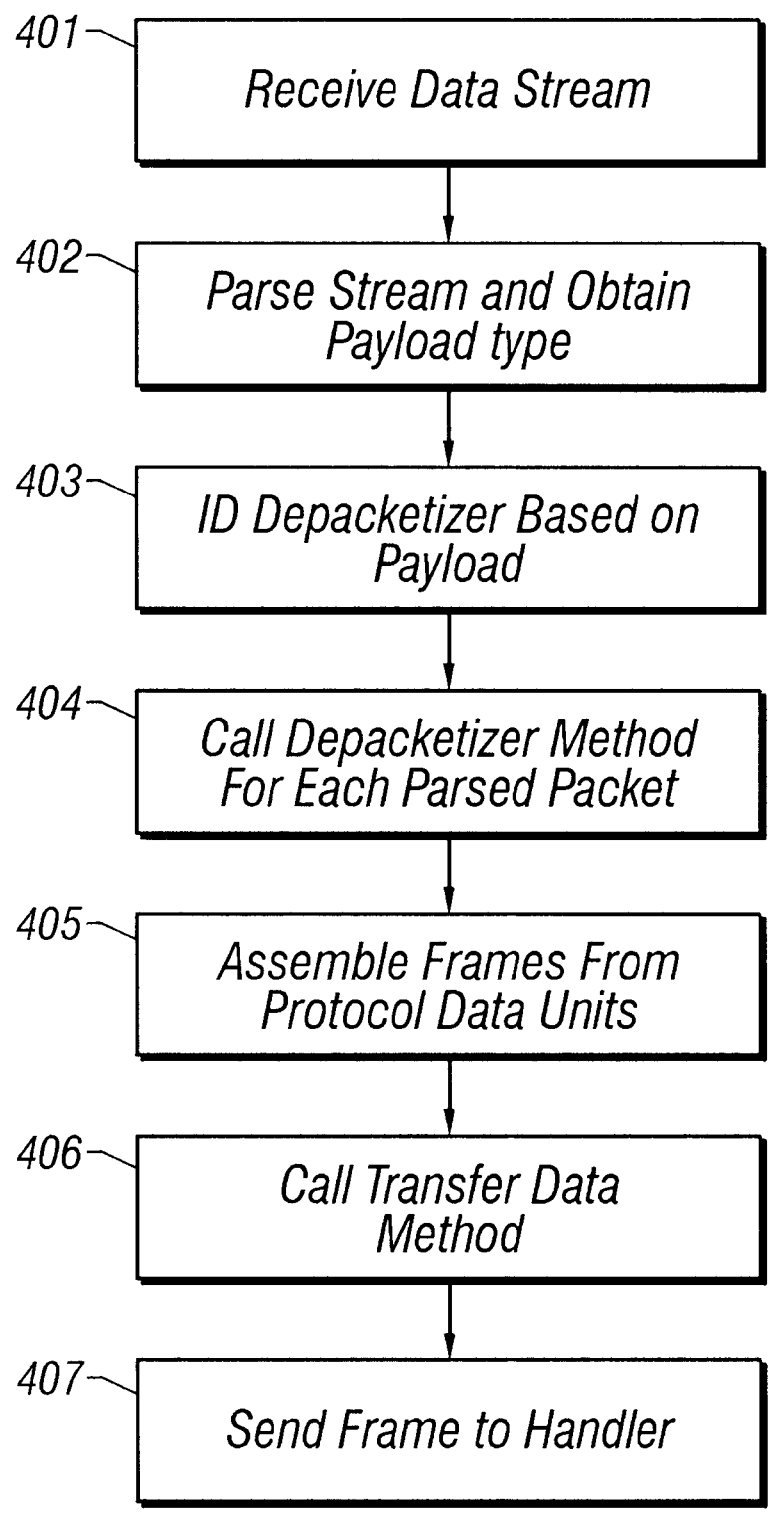
FIG. 4 is a flow diagram of the process of the present invention.

The preferred embodiment of the present invention provides a scheme for identifying an appropriate depacketizer module based on the codec type of incoming data. The depacketizer module assembles data into frames and provides it to a handler for decoding and playback. A flow diagram of this process is illustrated in FIG. 4.

At step 401 the RTP Session Manager receives a data stream. At Step 402 RTPSM obtains the payload type of the data stream by parsing the RTP header of the data.

At step 403 the appropriate depacketizer is called based on the results of the payload query in step 402. At step 404 the RTPSM calls the depacketize( ) method of the depacketizer each time it has received and parsed an RTP packet on the stream of the depacketizer.

The depacketizer assembles protocol data units received in the depacketize( ) method into application data units (frames) and notifies its DePacketizedDataHandler when it has finished preparing a frame of data at step 405 (RTPSM sets the transferHandler of the depacketizer once it has been instantiated using the depacketizer's setTransferHandler( ) method. The transferHandler of a depacketizer is a DePacketizedDataHandler and is the object to which depacketized data must be handed over by the depacketizer). Notification is done by calling the transferData( ) method of its DePacketizedDataHandler at step 406. The DePacketizedDataHandler then takes care of streaming the depacketized data to the handler of this stream at step 407.

Graphical Representation of the DePacketizer

Figure 3:
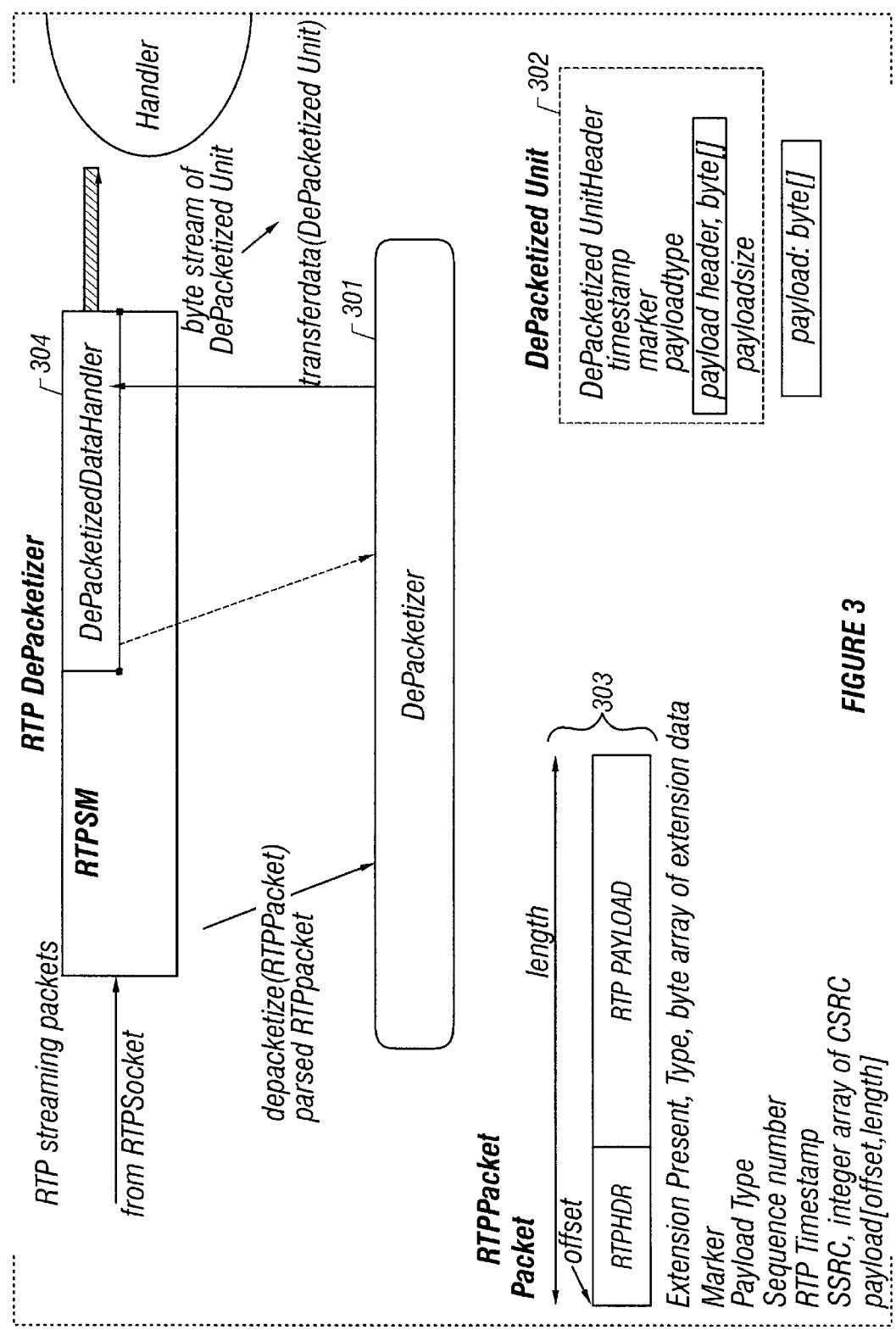
FIG. 3 illustrates the RTP Depacketizer of the present invention.

The operation of the Depacketizer is represented graphically in FIG. 3. RTP streaming packets are delivered to the RTP Session Manager 204. The RTP Session Manager examiners the first packet and examines the RTP header. The packet includes information such as Extension Present, Type, byte array of extension data, marker, Payload Type, Sequence Number, RTP timestamp, SSRC integer array of CSRC, and payload(offset, length). The parsed RTP packet is then provided to the DepacketizedDataHandler 301.

The Depacketizer depacketizes the RTP packet into a DepacketizedUnit 302. The DepacketizedUnit 302 includes a DepacketizedUnitHeader, a timestamp, a marker, payloadtype, payload header, and payload size. DepacketizedUnits are essentially data frames and are provided from the depacketizer to the depacketizedatahandler which is part of the RTPSM. The RTPSM 204 will then provide this frame to the handler 205 for decoding and playback.

Depacketizer Interface

In the Java language, an interface is a collection of constants and abstract methods. A class can implement an interface by adding the interface to the class's "implements" clause. An abstract method can be overridden (i.e. replaced). A variable can be declared as an interface type and all of the constants and methods declared in the interface can be accessed from this variable.

The preferred embodiment of the present invention includes an interface called "RTPDepacketizer". This interface is implemented by all plug-in depacketizers in RTPSM in the preferred embodiment. The entry point from the RTPSM to the depacketizer is via the depacketize method. Application data units or frames are transferred from the depacketizer to the RTPSM by calling the transferData( ) method of the DePacketizedDataHandler. The RTPSM is responsible for setting the DePacketizedDataHandler on a depacketizer. The Depacketizer interface implements the following methods:

depacketize public abstract void depacketize(RTPPacket p)

Called by RTPSM when a RTP packet arrives from the network or on the RTPSocket's output data stream.

setTransferHandler public abstract void setTransferHandler (DePacketizedDataHandler handler)

Used by RTPSM to set the transferHandler of this depacketizer. The depacketizer should call the transferData( ) method of its transferHandler when it has finished preparing a application data unit or frame. Object passed to the DePacketizedDataHandler is a DepacketizedDataUnit getMediaType public abstract String getMediaType( )

Used by RTPSM to retrieve the media type of the stream. This can be one of audio or video and is used to set content type of the RTPSM and the source streams it prepares.

getCodecString public abstract String getCodecString( )

Used by the RTPSM to set the codec string type on the data source stream it creates for the handler. This returns a string identifying the codec to be used. The Manager will locate a codec of type package-prefix.media.codec.mediatype.[codec-string].Codec.

public class DePacketizedUnitHeader

As illustrated in FIG. 3, a DePacketizedUnit includes a DePacketizedUnitHeader. A DePacketizedUnitHeader describes the DePacketizedUnit it belongs to. The header parameters are meant to describe the depacketized unit as a whole. The header contains certain fields from the RTP header of a packet considered relevant to the decoding and rendering process. In cases where the depacketizedUnit encompasses more than one RTP packet, the header needs to be filled correctly with data describing the unit as a whole. Programmers may have their own structure of the depacketized data unit or use the default class provided by RTPSM.

The constructor for this class is DePacketizedUnitHeader (long, int, int, int, byte[ ], int).

public DePacketizedUnitHeader(long rtptimestamp,
   int markerbit,
   int payloadtype,
   int payloadhdrsize,
   byte payloadhdr[ ],
   int payloadsize)

The parameters for this constructor are:

rtptimestamp—The RTP timestamp that came in protocol data units (RTP packets)of this stream. These are passed to the handler as they could be used for transferring timing information and synchronization by the handler markerbit—The marker bit in the RTP Header of this application data unit or frame. i.e. set to 1 if the marker bit was set for this ADU.

payloadtype—payload type of the data in this depacketizedunit payloadhdr—The payload specific header following the RTP header for this payload type payloadsize—Length of data in this DePacketizedUnit The methods of this class are as follows:

getSize public int getSize( )

getPayload public int getPayload( )

getMarker public int getMarker( )

getTimeStamp public long getTimeStamp( )

getPayloadHdrSize public int getPayloadHdrSize( )

getPayloadHdr public byte[ ] getPayloadHdr( )

public interface RTPPayload

This is the interface implemented by all RTP datasources in order to query the payload type of the data received on this datasource. If RTP data has not yet been received on this datasource, it will return the field UNKNOWN_PAYLOAD, a constant returned when no data has been received on this datasource.

The methods for this interface are as follows:

setPayloadType public abstract void setPayloadType(int type)

Used to set the payload of this datasource. If payload has previously been set, it will be reset to this new payload type.

getPayloadType public abstract int getPayloadType( )

Returns the payload type of this datasource getCodecString public abstract String getCodecString( )

Returns the Codec string for the codec to be used to decode data from this datasource setCodecString public abstract void setCodecString(String codec)

Used to set the codec string of the datasource/stream. If codec string has been previously set, it will be reset to this new codec string Content Handlers The invention provides a design that enables a programmer to plug-in his/her own depacketizer. Content handlers for this depacketizer should be available in order to playback this depacketized stream. In the preferred embodiment, integration between the depacketizer and content handler is provided when depacketizers implement a pluggable depacketizer interface and handlers are programmed to expect data in a pre-determined format described below in connection with pluggable depacketizers.

In the preferred embodiment, a default pre-determined format is provided in RTPSM, but this does not preclude the programmer from using his/her own format of depacketized data. Pluggable depacketizer naming and searching conventions are designed according to JMF's player factory architecture and use the same rules for integrating depacketizers into RTPSM. For example, to integrate a new depacketizer into JMF, 1) The depacketizer implements the interface defined below.

2) Install the package containing the new depacketizer class.

3) Add the package prefix to the content prefix list controlled by the PackageManager.

4) The DePacketizerFactory queries the PackageManager for the list of content package prefixes and search for <packageprefix>.media.rtp.depacketizer.avpx.DePacketizer class, where x is the RTP payload type for the installed depacketizer.

RTP Content Handlers are JMF players and should implement the methods and semantics of a Java Media Player. Integrating new handlers or players is as explained in the JMF specification attached as an Appendix. The content type of RTP datasources created by the session manager is one of "rtp/audio" or "rtp/video". Manager will consequently search for a handler of the type <packageprefix>.media.content.rtp.audio.Handler or <packageprefix>.media.content.rtp.video.Handler.

Note: JMF will not change handlers once a handler has been chosen and created by Manager. It is therefore important to note that the loaded Handler should be capable of supporting expected audio or video RTP payload types in order to successfully playback data streams.

Manager creates the datasource and sets it on the handler. This datasource is a PushDataSource and streams a PushSourceStream as explained in the JMF specification in package javax.media.protocol. Handlers can read data from this stream as explained in the specification. When the Manager creates a datasource and locates a handler for it, it calls setsource( ) on the handler, passing it the datasource. At this time, the handler returns an IncompatibleSourceException if it does not support the datasource. All RTP datasources implement the javax.media.rtp.RTPPayload interface. The getPayloadType( ) method can be used by the handler to query the payload type of the datasource. If the handler does not support playback of the payload type, it may return an IncompatibleSourceException. This causes Manager to continue searching for a handler that does support this datasource. In this manner, implementations can default to using handlers in the system that do support a certain payload not supported by this handler. Note: The RTP datasource can return a payload type only after data has actually been received on it. This is not a guaranteed process to happen before the getPayload( ) call is issued. In the event that data is not received on the datasource, UNKNOWN_PAYLAOD is returned by the datasource. The handler at this time can use its discretion and make a decision to support any payloads expected on this stream or to throw an IncompatibleSourceException.

The RTP Session Manager will stream data to the content handler as a PushSourceStream. The byte stream read by the handler is a DePacketizedObject converted to a stream of bytes. The structure of the object need not be known to the RTPSM. It uses the toByteStream( ) method of the interface to stream bytes from the DePacketizedObject to the sourcestream of the handler. RTPSM provides a default implementation of the DePacketizedObject interface. i.e. DePacketizedUnit.java. Programmers can write depacketizers which create a DePacketizedUnit explained in javax.media.rtp.RTPSessionManager.dePacketizer.DePacketizedUnit.java. The toByteStream( ) method has been implemented in DePacketizedUnit. Thus the user need not do anything more than create a DePacketizedUnit.

Thus, a method and apparatus for providing a selectable depacketizer has been described in conjunction with one or more specific embodiments. The invention is defined by the claims and their full scope of equivalents.

What is claimed is:

1. In a computer system having a plurality of depacketizers, a method configured to select a depacketizer for a datastream, said method comprising:

installing a package containing a new depacketizer class, said package having prefixes;

adding said package prefixes to a list controlled by a package manager;

receiving a datastream;

selecting one of said plurality of depacketizers based on a type of data in said datastream;

searching said list for a prefix based on the type of data in said datastream to find a handler configured to interface with said selected depacketizer;

providing packets of said datastream to said selected depacketizer;

assembling packets into frames;

providing said frames to said handler;

decoding said frames into media data.

* * * * *